United States Patent [19]
Koiwai et al.

[11] Patent Number: 5,369,457
[45] Date of Patent: Nov. 29, 1994

[54] PATRONE

[75] Inventors: Tamotsu Koiwai, Akikawa; Kazutoshi Shiratori, Hino, both of Japan

[73] Assignee: Olympus Optical Co., Ltd., Tokyo, Japan

[21] Appl. No.: 96,473

[22] Filed: Jul. 22, 1993

[30] Foreign Application Priority Data

Jul. 23, 1992 [JP] Japan .................. 4-197177
Jan. 13, 1993 [JP] Japan .................. 5-004310

[51] Int. Cl.⁵ ............................ G03B 17/26
[52] U.S. Cl. ................................ 354/275
[58] Field of Search ........... 354/105, 106, 275, 277; 242/71.1, 71.2

[56] References Cited

U.S. PATENT DOCUMENTS

| | | | |
|---|---|---|---|
| 4,218,032 | 8/1980 | Nagel et al. | 242/71.1 |
| 4,423,943 | 1/1984 | Gold | 354/275 |
| 4,443,077 | 4/1984 | Tanikawa | 354/275 X |
| 4,455,076 | 6/1984 | Birkeland | 354/275 |
| 4,860,966 | 8/1989 | Cloutier | 354/275 X |
| 4,930,712 | 6/1990 | Smart | 354/275 X |
| 5,187,518 | 2/1993 | Kitagawd | 354/105 X |

FOREIGN PATENT DOCUMENTS

| | | |
|---|---|---|
| 3-116136 | 5/1991 | Japan . |
| 3-180837 | 8/1991 | Japan . |
| 4-3153 | 1/1992 | Japan . |
| 4-67034 | 3/1992 | Japan . |

Primary Examiner—Howard B. Blankenship
Attorney, Agent, or Firm—Louis Weinstein

[57] ABSTRACT

A Patrone according to the present invention comprises a spool that winds film in the form of a roll between two flanges thereof, and a Patrone body for storing said spool so that the spool can rotate freely. The spool is made of a shading material. The distal part of the film is provided with a leader whose width is equal to or smaller than the dimension between the two flanges and which winds round the outer circumference of film wound about the spool by at least one turn. The leader may also be formed of or include a shading material.

27 Claims, 7 Drawing Sheets

PATRONE

BACKGROUND OF THE INVENTION

1. Field of the Invention

The present invention relates to a Patrone including a spool that winds up film in the form of a roll and a Patrone body for storing the spool so that the spool can rotate freely about the axis thereof.

2. Description of the Related Art

In recent years, proposals have been made for a camera employing a Patrone that enables automatic film feed. After the Patrone is mounted, when a spool axis is rotated, a leader formed in the distal part of film can be fed to a film-wind spool. A variety of proposals have also been made for the structure of the Patrone, especially, for the structure of a shading structure.

A camera in which a magnetic recording means is incorporated has been put to use. A camera that makes it possible to record photographic information or information of processing to be done at a processing laboratory in a magnetic recording section of film has also been proposed. Numerous proposals have been made for a Patrone having a magnetic recording section.

When it comes to the shading structure for a Patrone, a Patrone for photographic film proposed in Japanese Patent Laid-Open No. 4-3153 has an elastic shading plate at a film outlet and thus reduces the resistance against film feed. This art also provides a shading capability that proves effective for film rewind.

The Patrone for photographic film disclosed in Japanese Patent Laid-Open No. 4-3153 has a drawback that when the adhesion of an elastic member improves, the resistance against film passage increases.

A film cartridge for photographic film disclosed in Japanese Patent Laid-Open No. 4-67034 has a structure for intercepting external light by narrowing a space inside the inner wall of a film path, to which a plush is attached at a film outlet, from outside the film path.

In the film cartridge for photographic film disclosed in Japanese Patent Laid-Open No. 4-67034, however, plushes must be overlapped in order to realize reliable shading using plushes. This leads to higher resistance against film passage.

In a film cartridge disclosed in Japanese Patent Laid-Open No. 3-116136, a rotatable shading member is installed independently at a film outlet. No resistance arises against film loading. When stored, the film is shielded from light reliably.

In the film cartridge disclosed in Japanese Patent Laid-Open No. 3-116136, the mechanisms of a rotary member and a rotation drive member are complex. This results in an increase in costs.

Various proposals have been made for the structure of a Patrone that is preferred for a new film format and enables auto-loading of film with ease. For example, a structure disclosed in Japanese Patent Laid-Open No. 3-180837 relates to a Patrone of a film-feed type. As for the Patrone of this proposal, a variety of Improvements for simplifying automatic film feed have been implemented in the shape of the Patrone. The Patrone itself is shaped conveniently for manufacturing by plastic molding, which is lower in cost than a conventional Patrone made of metal.

When film has a magnetic recording section, there is a possibility that magnetic information recorded in the film may be deleted accidentally by a strong external magnetic field induced in, for example, a magnet. A measure must therefore be taken against accidental deletion of magnetic information. In the Patrone of an automatic feed type disclosed in the Japanese Patent Laid-Open No. 3-180837, however, the Patrone itself is adroitly shaped so that film will be fed smoothly by auto-loading. The shape makes manufacturing difficult unless plastic molding is employed.

If a Patrone having the above shape is manufactured using a metal, costs increase. If downsizing is attempted, the number of parts increases.

When a non-magnetic material such as plastic is employed as mentioned above to manufacture a film storage for the film having a magnetic recording section, the magnetic recording section cannot be protected from an external magnetism.

An auto-feed type Patrone has a problem that since the distal part of film itself is relatively soft, it is hard to feed the distal part of film through plushes at an outlet of the Patrone.

In not only the auto-feed type but also an auto-loading type for hooking perforations of film, if a distal part of film has poor strength, perforations are likely to break away.

OBJECTS AND SUMMARY OF THE INVENTION

A first object of the present invention is to provide a Patrone that enables reduction of resistance against film feed, has a shading structure capable of reliably shaping a photographic part of film, and is low in cost.

A second object of the present invention is to provide a Patrone that magnetically protects film having a magnetic recording section, has a shading structure, is compactly-designed preferably for film auto-loading including automatic feed, and is low in cost.

One Patrone of the present invention comprises film having a shading sheet, which is rigid enough to supplement the rigidity of film, at the distal part of a section used for imaging, a spool that is made of a shading material and winds the film in the form of a roll between flanges at both ends thereof, and a Patrone body in which the spool is stored so as to be rotatable about an axis thereof. When the film is stored in the Patrone body, the shading sheet winds around the outer circumference of the section used for imaging by at least one turn.

Another Patrone of the present invention comprises film in which a leader, which has a shading characteristic and a magnetism, is formed between a magnetic recording section and a distal part thereof, a spool that is made of a shading material, winds the film in the form of a roll between flanges formed at both ends thereof, and a Patrone body that is a non-magnetic member and in which the spool is stored so as to be freely rotatable about the axis thereof. When the film is stored in the Patrone body, the leader winds around the outer circumference of the section used for imaging by at least one turn, and the magnetic recording section is not exposed magnetically.

Other features and advantages of the present invention will be apparent from the description below.

DETAILED DESCRIPTION OF THE PREFERRED EMBODIMENT

Embodiments of the present invention will be described in conjunction with the drawings.

Figure 1:
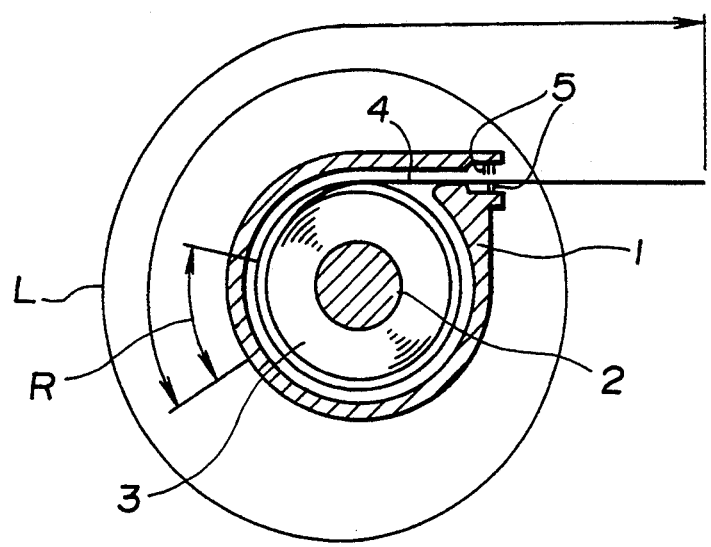
FIG. 1 is a cross-sectional diagram or a Patrone representing first embodiment of the present invention.
Figure 2:
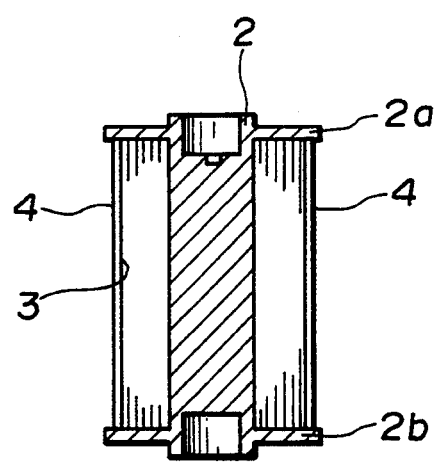
FIG. 2 shows a longitudinal section of the Patrone in FIG. 1.
Figure 3:
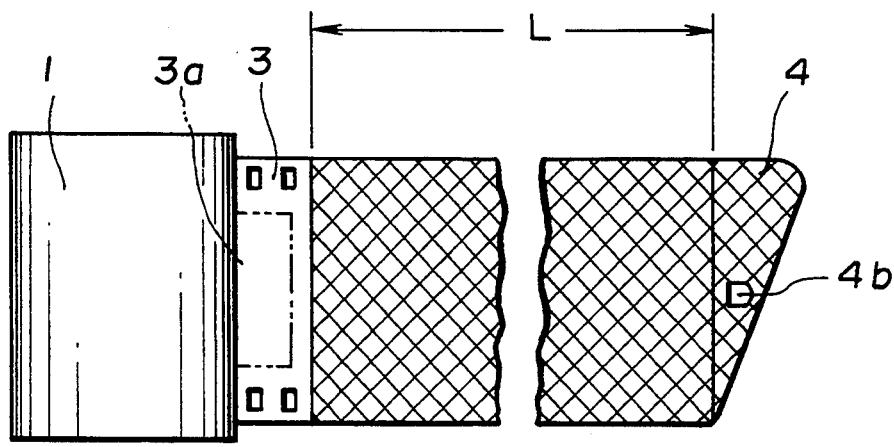
FIG. 3 is a front view of the Patrone in FIG. 1 with the leader pulled out.

FIG. 1 is a cross-sectional diagram of a Patrone representing the first embodiment of the present invention. FIG. 2 shows a longitudinal section of the Patrone. FIG. 3 is a front view of the Patrone with the leader at the distal part of film pulled out.

A Patrone of this embodiment comprises a Patrone body 1, a spool 2 that is a shading member to be stored in the body 1, film 3 having an imaging section 3a, a leader 4 that is the distal part of the film 3 and processed by opaque printing so as to possess a shading characteristic, and shading plushes 5 arranged at a film port of the Patrone body 1.

Figure 4:
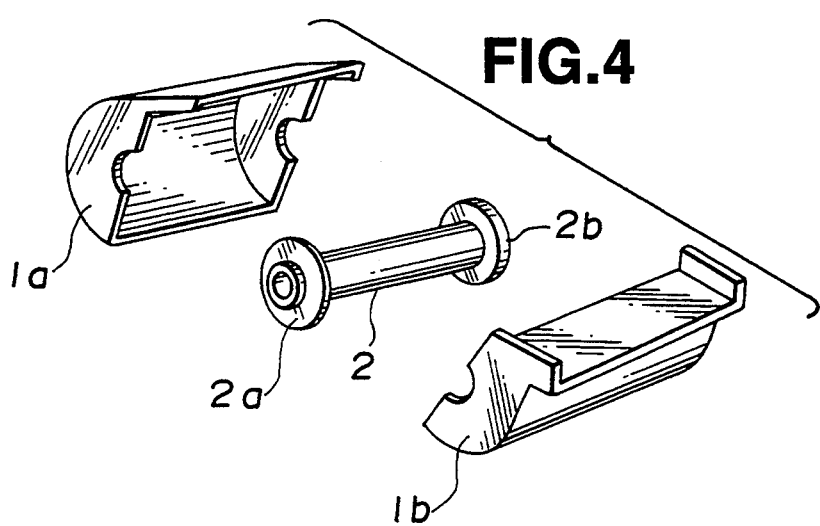
FIG. 4 is an exploded oblique view of a Patrone body and a spool of the Patrone in FIG. 1.

The spool 2 has flanges 2a and 2b at both ends thereof. As shown in the exploded oblique view of FIG. 4, the spool 2 is clamped between two Patrone body sections 1a and 1b which are to be Joined and held to be freely rotatable therein. The film 3 and leader 4 are wound about the spool 2 in the form of a roll.

The length L of the leader 4 shown in FIG. 3 is determined in a state of a Patrone unit or a state in which the Patrone is not loaded in a camera, so that the distal end of the leader 4 is slightly exposed from the film port, the leader 4 winds around the outer circumference of the wound film 3 by one turn or more in the Patrone body 1, and the leader 4 overlaps itself. A range R in FIG. 1 represents the overlap area. A camera loading hole 4b is bored in the distal part of the leader 4, to which a spool take-up claw (not shown) arranged in a camera will be fitted when the Patrone is mounted in the camera.

The widths of the film 3 and leader 4 are slightly smaller than the dimension between the flanges 2a and 2b of the spool 2. The shading plushes 5 have a minimum length required for shading as an attempt to reduce the resistance against feeding of the film 3 and are opposed to each other up and down in FIG. 1 at the film port of the Patrone body.

In the foregoing Patrone of this embodiment, the film 3 is wound about the spool 2 with one end thereof fixed. In a state of a Patrone unit or a state in which the Patrone is not mounted in a camera, as shown In FIG. 1, the film 3 having an imaging picture area 3a is wound up in the Patrone body 1. The leader 4 is wound about the outer circumference of the film 3. Since the leader 4 has, as mentioned above, the length L permitting one turn or more about the outer circumference, the portion of the leader 4 that is wound up last overlaps the proximal portion thereof. An overlap winding range R is thus provided for the leader 4. The leader 4 is, as shown in FIG. 2, wound about the circumference of the film 3 wound about the spool 2.

The dimension between flanges 2a and 2b of the spool 2 is nearly equal to the width of the leader 4. The film 3 wound inside the leader 4 is therefore stored in a shaded space surrounded with the leader 4 having a shading characteristic, the axis of the spool 2, and the spool flanges 2a and 2b, and shaded substantially perfectly. A minor space may be created between the flanges 2a and 2b of the spool 2 in a direction transversing the leader 4. Since the imaging picture area 3a is, as shown in FIG. 3, located away from the edges of the film 3 at the ends of the width thereof, light hardly propagates to the imaging picture area 3a. No problem occurs.

In order to reduce the resistance against feeding of the film 3, the plushes 5 or shading members lying at the film port of the Patrone body 1 in this embodiment have a minimum possible length. As described above, the leader 4, and spool flanges 2a and 2b provide a secondary shading means to ensure a satisfactory shading characteristic. This embodiment will prove effective for a Patrone having short plushes 5.

Even when shading is attained unsatisfactorily in the space between the spool 2 and Patrone body 1 or at the junction between two sections of the Patrone body 1, the film 3 can be shaded reliably owing to the shading operation by the leader 4 and spool flanges 2a and 2b.

In this embodiment, shielding can also be achieved merely by providing the distal part of the film 3 with the leader 4 that has undergone shading printing. This embodiment is therefore advantageous from the viewpoint of costs.

Even when the shading structure of this embodiment applies to a Patrone in which the distal part of the leader 4 is fully wound up In the Patrone body 1, the leader 4 is wound about the outer circumference of the film 3 by one turn or more. The same advantages as those provided by the previous embodiment are available.

Next, a Patrone of the second embodiment of the present invention will be described.

Figure 5:
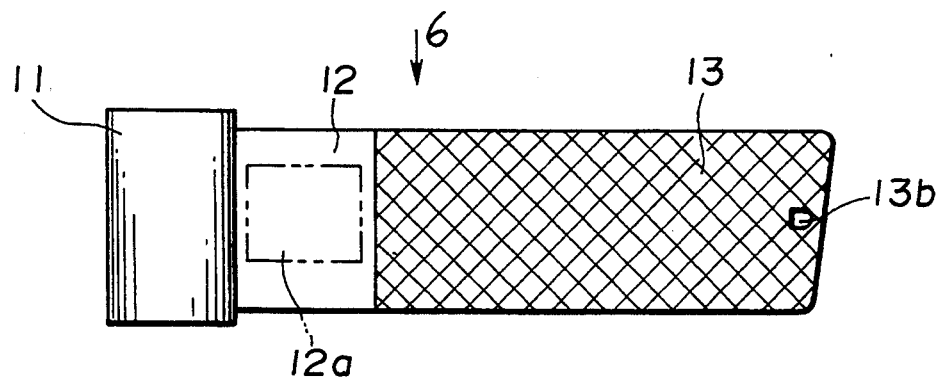
FIG. 5 is a front view of a Patrone representing a second embodiment of the present invention with the distal part of film pulled out.
Figure 6:
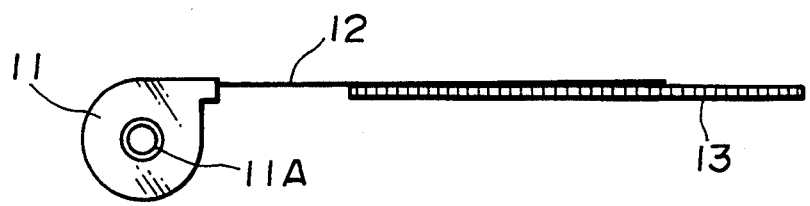
FIG. 6 is a view looking in the direction of arrow 6 of FIG. 5.

FIG. 5 is a front view of a Patrone of this embodiment with the distal part of film pulled out. FIG. 6 shows a view of the Patrone looking in the direction of FIG. 5. In this embodiment, film 12 having an imaging area 12a is wound about a spool 11A in a Patrone body 11. A shading sheet made of a material different from that made into the film 12 is adheres to a leader 13 formed in the distal part of the film 12. The shading sheet is, for example, a black polyester sheet having a shading characteristic. A camera loading hole 13b is bored in the distal part of the leader 13.

In a state of a Patrone unit or a state in which a Patrone is not mounted In a camera, the leader 13 that is part of the film 12 with the shading sheet adhering is, similar to that in the first embodiment, wound about the spool 11A supported in the Patrone body 11. A shaded space described in conjunction with FIG. 2 is created between the leader 13 and spool 11A. The film 12 wound inside the leader 13 is therefore held shaded.

In this embodiment, the leader 13 is made of a different material. This structure provides a more satisfactory shading characteristic and compensates for the low rigidity of the film 12. The film 12 can be fed more smoothly by driving the spool 11A.

Next, a Patrone of the third embodiment of the present invention will be described.

Figure 7:
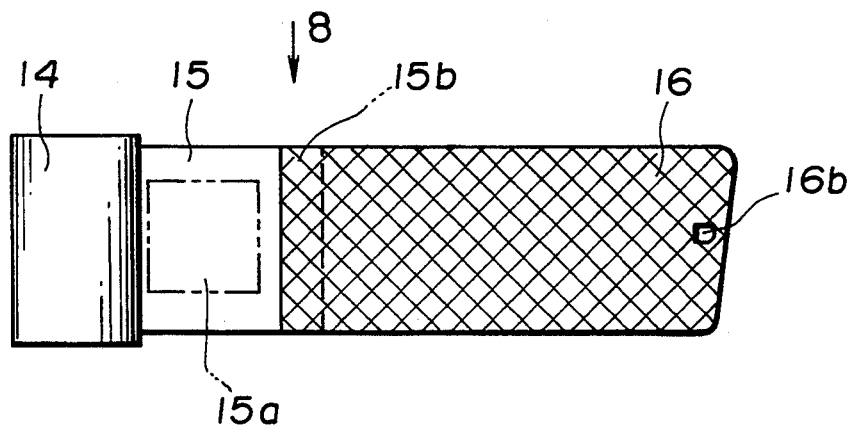
FIG. 7 is a front view of a Patrone representing a third embodiment of the present invention with the distal part of film pulled out.
Figure 8:
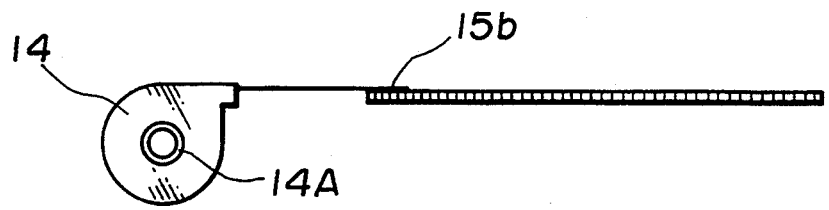
FIG. 8 is a view of FIG. 7.

FIG. 7 is a front view of a Patrone of this embodiment with the distal part of the Patrone looking in the direction of arrow 8 in film pulled out. FIG. 8 is a view of FIG. 7. Even In this embodiment, film 15 having an imaging area 15a is wound about a spool 14A in a Patrone body 14. A leader 16 that is made of a shading material and is a member different from the film 15 is coupled with a distal junction 15b of the film 15. A camera loading hole 16b is bored in the distal part of the leader 16.

In a state of a Patrone unit or a state in which a Patrone is not mounted In a camera, the film 15 and leader 16 are wound in the Patrone body 14. Similar to the first embodiment, the leader 16 and spool 14A provides a shaded space to shade the film 15 wound in the shaded space.

In this embodiment having the foregoing structure, the leader 16 is a different member. Similar to the second embodiment, this embodiment provides a reliable shading capability, and offers a leader having excellent rigidity and sliding friction characteristics appropriate for feeding film.

Next, a Patrone of the fourth embodiment of the present invention will be described.

Figure 9:
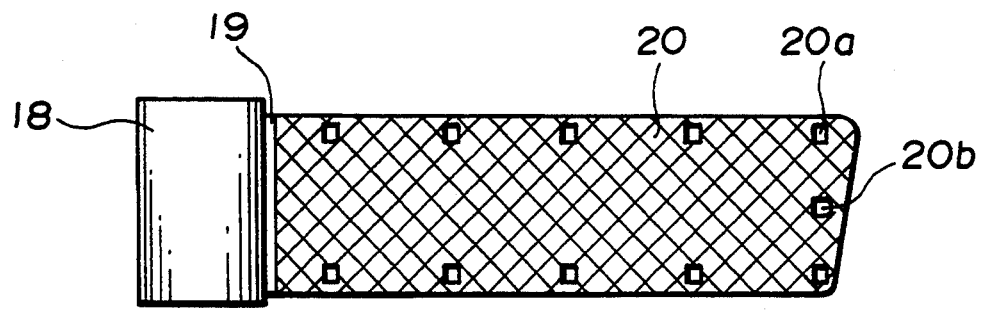
FIG. 9 is a front view looking in the direction of arrow 8 of a Patrone representing the fourth embodiment of a present invention with the distal part of film pulled out.
Figure 10:
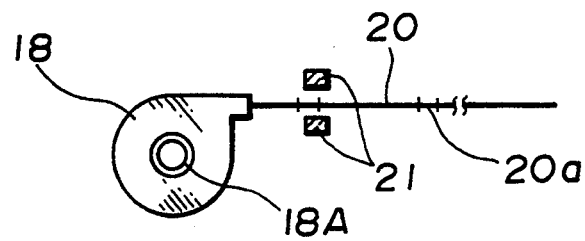
FIG. 10 is a cross-sectional diagram of the Patrone in FIG. 9 showing a state in which film is being pulled out and an initial feed of the leader is detected.
Figure 11:
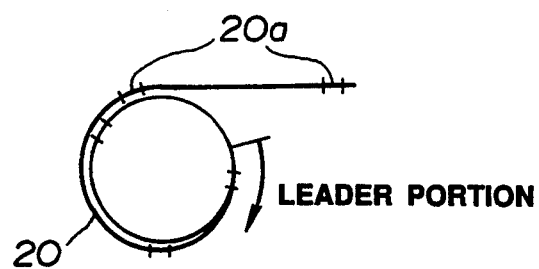
FIG. 11 is a cross-sectional diagram of the Patrone in FIG. 9 showing a state in which film is being pulled out.

FIG. 9 is a front view of a Patrone of this embodiment with the distal part of film pulled out. FIG. 10 is a cross-sectional diagram, showing a state in which film is pulled out and an initial feed of a leader is detected. FIG. 11 is a cross-sectional diagram, showing a state in which film is pulled out. Even in this embodiment, similar to the previous embodiment, film 19 having an imaging section is wound about a spool 18A in a Patrone body 18.

A leader 20 that has a shading characteristic and is processed by opaque printing Is formed in the distal part of film. The leader 20 has a camera loading hole 20b that helps wind the leader 20 on a spool in a camera reliably, and multiple perforations 20a that assist a photointerrupter 21 (See FIG. 10) in sensing an initial feed of film.

The leader 20 is wound about a spool in the Patrone body 18, whereby a shaded space similar to that in the first embodiment is created between the leader 20 and spool 18A. The length of the leader 20 is equivalent to the number of turns required for preventing the film 19 wound inside from being exposed through the perforations 20a serving as feeding holes. For realizing a shortest possible leader, the perforations 20a are arranged so that when the leader 20 is wound about the spool 18A, the perforations 20a in the leader 20 wound inside will not coincide with those in the leader 20 wound outside. Light will therefore not leak out through the perforations 20a.

The Patrone in this embodiment having the foregoing structure has the perforations 20a arranged in the leader 20, which enables detection of an initial feed. The Patrone thus has a structure enabling accurate detection of an initial feed. Furthermore, the Patrone, like that in the first embodiment, provides a substantially perfect shading capability. Moreover, initial film feed can be achieved smoothly.

Figure 12:
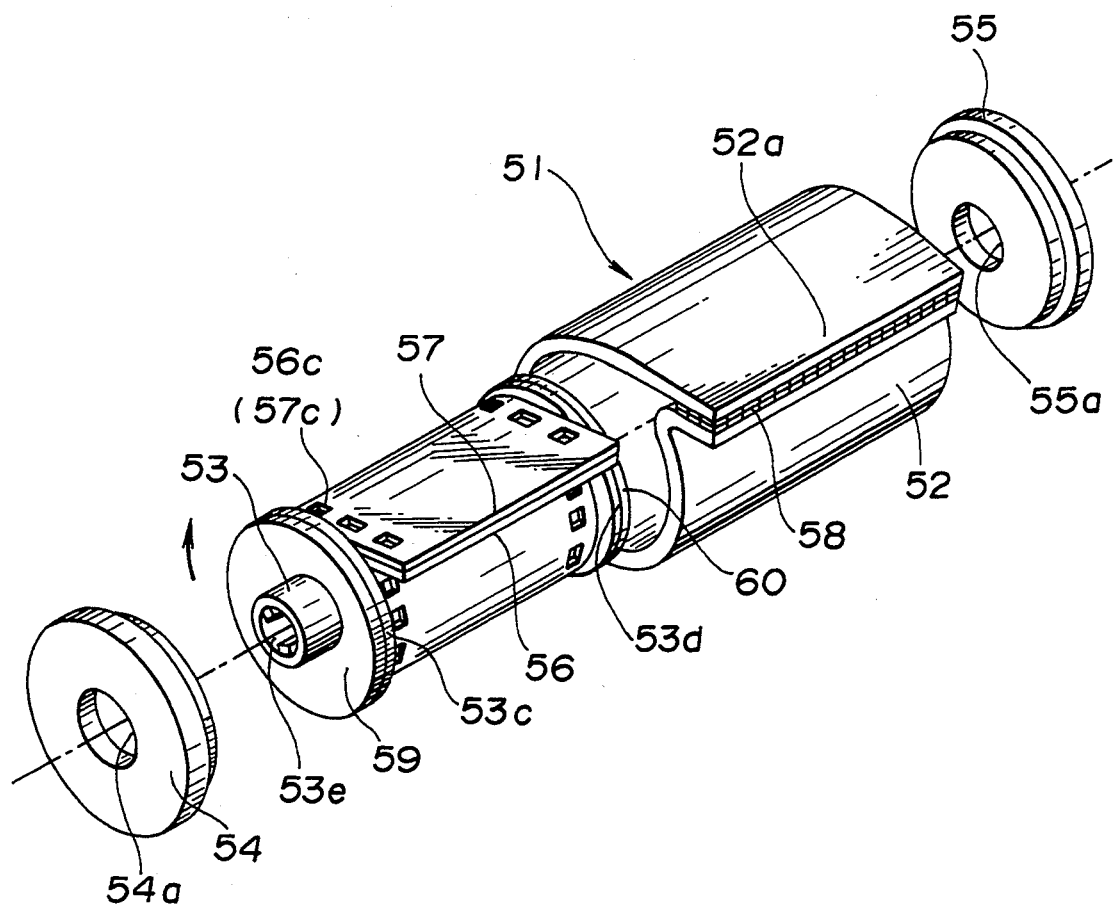
FIG. 12 is an exploded oblique view of a Patrone representing the fifth embodiment of a present invention.
Figure 13:
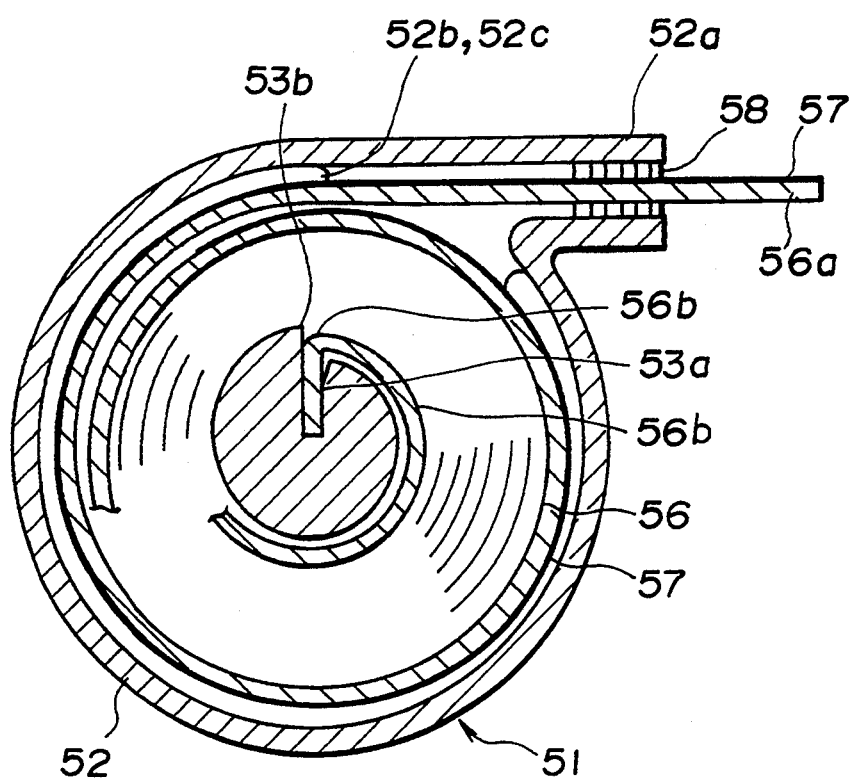
FIG. 13 is a cross-sectional diagram of the Patrone in FIG. 12.
Figure 14:
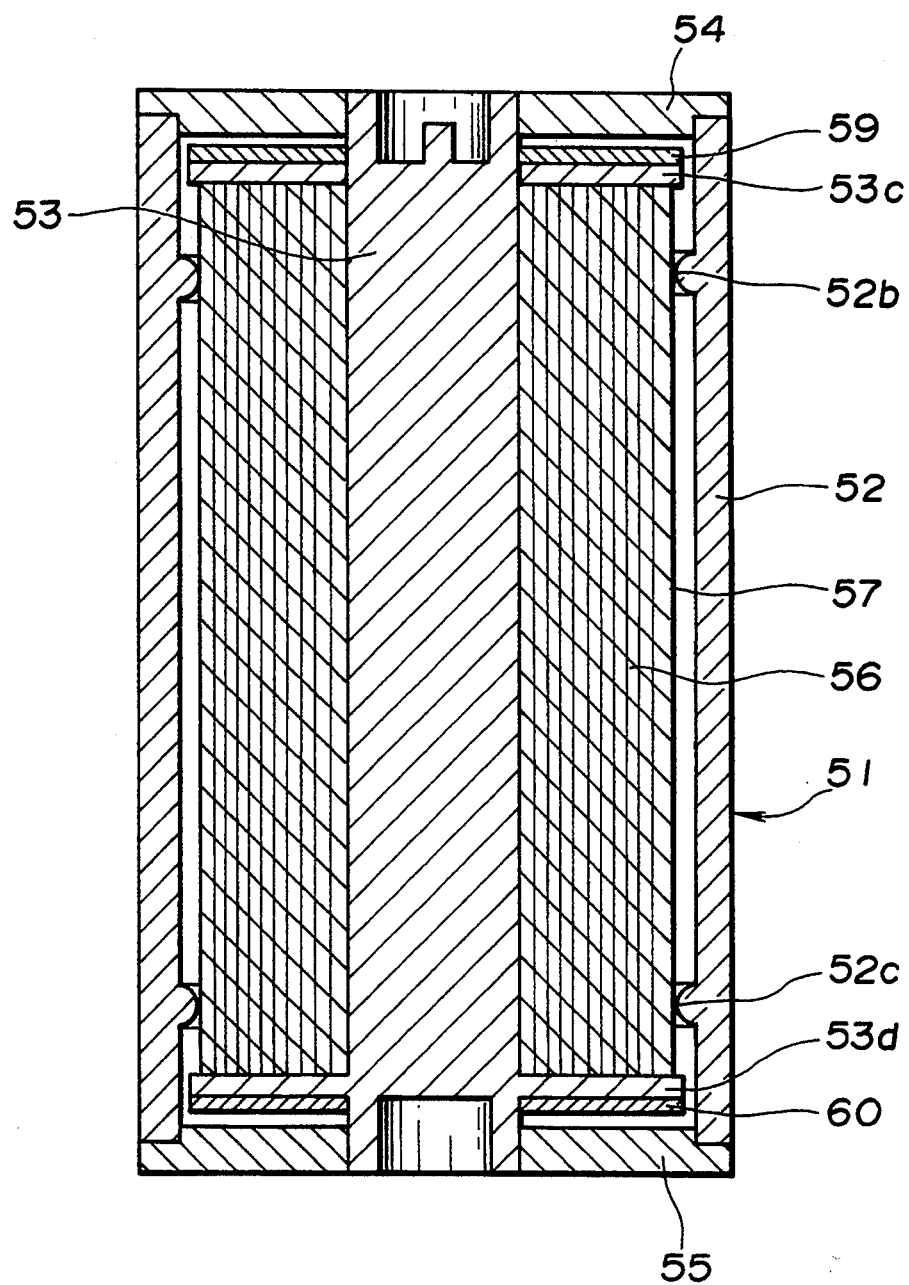
FIG. 14 shows a longitudinal section of the Patrone in FIG. 12.

FIG. 12 is an exploded oblique view of a Patrone representing the fifth embodiment of the present invention. FIG. 13 is a cross-sectional diagram of the Patrone. FIG. 14 shows a longitudinal section of the Patrone.

To begin with, referring to FIGS. 12 to 14, the structure of a Patrone 51 in this embodiment will be described. Film 56 loaded In the Patrone 51 has a magnetic recording section. A proximal end 56b of the film 56 is, as shown In FIG. 13, fitted Into a ditch 53a on a spool 53, fixed with an adhesive, and wound about the spool 53. An iron sheet 57 serving as a magnetic coat Is attached to a distal part 56a of the film 56 over the whole width of the film 56 by a length equivalent to one turn or more around the outer circumference of the film 56. The iron sheet 57 is thinner than the film 56 of about 0.1 mm thick. The film 56 therefore has sufficient flexibility even when wound up. The distal part 56a with the iron sheet 57 adhering will not lose a capability for being restored from an elastically-bent state or a wound state. The film 56 and iron sheet 57 have perforations 56c and 57c serving as feeding holes. The locations of the perforations 56c and 57c are mutually consistent over the portion of the film 56 to which the iron sheet is adhering.

Iron sheets 59 and 60 that are doughnut-shaped magnetic members adheres to the outer sides of collars 53c and 53d on both sides of the spool 53. The spool 53 with the film 56 wound thereabout is loaded in the Patrone body 52 serving as a storage container that is a nonmagnetic member. Side covers 54 and 55 are attached to both ends of the Patrone body 52, and then sealed. The axially aligned ends of the spool (see end 53) each engage an associated axial holes 54a and 55a in the side covers 54 and 55. Shading plushes 58 adhere to the inside of a film outlet 52a of the Patrone body 52.

When the Patrone 51 having the foregoing structure is mounted in a camera, a rewind fork (not shown) in the camera engages with claws 53e in the spool 53, and rotates clockwise. A ditch step 53b of the spool 53 presses the proximal end 56b of film. The distal part 56a of film expands toward the outer circumference, abuts on innercircumferential ribs 52b and 52c arranged about the inner periphery of the Patrone body, and rotates clockwise. The distal part 56a of film 56 is then pushed out to pass through the plushes 58 at the Patrone outlet 52a. The distal part 56a of film is then pushed out of the Patrone 51.

In this state, since the iron sheet 57 of a specified length is adhering to the distal part 56a of film, the rigidity and strength are higher than those of a film unit even during the aforesaid film feed. The distal part 56a of film can therefore come out of the film outlet against the resistance of the plushes 58.

In the Patrone 51 of this embodiment having the aforesaid structure, when film has been taken up, one turn or more of the outer circumference of the film 56 wound about the circumferential side surface of the spool 51 is magnetically shielded with the iron sheet 57. The portions of the film 56 at the ends of the spool in the axial direction of the spool are magnetically shielded with the iron sheets 59 and 60 adhering to the spool collars 53c and 53d. Magnetic shielding is therefore substantially fully attained inside the Patrone. Recorded information will therefore not be deleted accidentally. Even when the film storage container is made of a non-magnetic material such as plastic, taken-up film can be magnetically shielded. Magnetic information on the film can be protected magnetically. Furthermore, a film storage container can be made of plastic, which realizes cost cutting.

When this embodiment applies to a Patrone of a film-feed type, the improved strength of the distal part 56a of film allows film to put through the plushes of a Patrone more smoothly. A failure rate of automatic film feed diminishes drastically. Even when this embodiment applies to a Patrone of an auto-loading type except the film-feed type, the improved strength of the distal part of film prevents perforations from breaking away and reduces the failure rate of auto-loading.

In the aforesaid embodiment, the iron sheet 57 adheres to the film 56. The material for the sheet is not limited to iron but may be any magnetic material that can be processed in the form of a sheet. For example, a stainless alloy also provides the same advantages as those mentioned above. The material for the sheets for magnetically shielding the sides of film may also be a stainless alloy or a magnetic ink used for printing, provided on said film. The side covers of a Patrone or the spool collars 53c and 53d themselves may be made of a magnetic material.

This embodiment provides a Patrone of an automatic film-feed type. A Patrone of a film pull-out system auto-loading type can be realized with any of the aforesaid structures. Even in this case, an iron sheet adhering to the distal part of film will prove effective in preventing perforations from breaking away.

What is claimed is:

1. A Patrone, comprising:
a film in which a shading sheet that is rigid enough to supplement the rigidity of film is adhered to a distal part of a film section used for imaging to enhance automatic film feeding;
a spool that is made of shading material and winds said film in the form of a roll between flanges located at both ends thereof;
a Patrone body for storing said spool so that the spool can rotate freely about the axis thereof; and
when said film is stored in said Patrone body, said shading sheet being of a length sufficient to wind around an outer circumference of said film section used for imaging by at least one turn;
said shading sheet having feeding holes along at least one edge of said leader; and said feeding holes being arranged so that when said shading sheet is wound about the outer circumference of said section used for imaging, the feed holes are displaced from one another to prevent leakage of light.

2. A Patrone according to claim 1, wherein said shading sheet Is a black polyester sheet.

3. A Patrone according to claim 1 wherein the shading sheet has a width which is no greater than a width of said film.

4. A Patrone according to claim 1 wherein the Patrone body has an elongated opening for feeding film therethrough, said opening having plushes, said distal part being sufficiently thin and rigid to facilitate feeding through said plushes.

5. A Patrone, comprising:

a film in which a leader made of a material having excellent characteristics of shading, rigidity, and sliding friction is formed in a distal part of a section used for imaging to enhance automatic film feeding;
a spool that is made of a shading material and winds said film in the form of a roll between flanges located at both ends thereof;
a Patrone body for storing said spool so that the spool can rotate freely about the axis thereof; and
when said film is stored in said Patrone body, said shading sheet winding around an outer circumference of said section used for imaging by at least one turn;
said leader having a shading characteristic has feeding holes along at least one longitudinal edge of said leader; and said feeding holes being arranged so that when said leader is wound about the outer circumference of film used for imaging, they are displaced from one another to prevent leakage of light.

6. A Patrone, comprising:
a film including a magnetic recording section and a leader that is located in a distal part thereof and has a shading characteristic and a magnetic field shielding portion;
a spool that is made of a shading material and winds said film in the form of a roll between flanges located at opposite ends thereof;
a Patrone body that is a non-magnetic member and stores said spool so that the spool can rotate freely about an axis thereof; and
when said film is stored in said Patrone body, said leader winding around the outer circumference of said section used for imaging by at least one turn, and said magnetic recording section being magnetically shielded.

7. A Patrone according to claim 6, wherein said leader has a shading characteristic and is made of a magnetic field shielding material that can adhere to film and is in the form of a sheet.

8. A Patrone according to claim 7, wherein said sheet is made of iron or a stainless alloy.

9. A Patrone according to claim 8, wherein said sheet is thinner than said film.

10. A Patrone according to claim 6, wherein sides of flanges located at both ends of said spool are provided with doughnut-shaped magnetic field shielding members.

11. A Patrone according to claim 6, wherein said flanges located at both ends of said spool are magnetic field shielding members.

12. A Patrone, comprising:
film including a magnetic recording section and a magnetic field shielding leader located at a distal part thereof;
a spool for winding said film in a form of a roll between flanges located at opposite ends thereof;
a Patrone body that is a non-magnetic member and stores said spool so that the spool can rotate freely about an axis thereof; and
when said film is stored in said Patrone body, said leader winding around an outer circumference of film by at least one turn so that said magnetic recording section of said film will be protected against exposure to an external magnetic field.

13. A Patrone according to claim 12, wherein said magnetic field shielding leader is made of a magnetic material that can adhere to film and is in sheet form.

14. A Patrone according to claim 13, wherein said sheet is made of one material taken from a group of materials consisting of iron and a stainless alloy.

15. A Patrone according to claim 14, wherein said sheet is thinner than said film.

16. A Patrone according to claim 12, wherein sides of flanges located at both ends of said spool are provided with doughnut-shaped magnetic field shielding members.

17. A Patrone according to claim 12, wherein said flanges located at both ends of said spool are magnetic field shielding members.

18. A Patrone for a camera, comprising:
a film storage container made of a non-magnetic material;
a film having a magnetic recording section;
a magnetic field shielding member formed in a distal part of said film so that when said film is taken up into said film storage container, it shields the magnetic recording sections of the film from an external magnetic field.

19. A Patrone for a camera according to claim 18, wherein said magnetic field shielding member is a sheet which adheres to the distal part of said film.

20. A Patrone for a camera according to claim 18, wherein said magnetic field shielding member is a sheet coupled with the distal part of said film.

21. A Patrone for a camera according to claim 19 or 20, wherein said sheet is made of a material taken from a group consisting of iron and a stainless alloy.

22. A Patrone for a camera according to claim 19 or 20, wherein said sheet is deposited in the distal part of said film.

23. A Patrone for a camera according to claim 19 or 20, wherein said sheet is a layer printed upon a surface of the distal part of said film.

24. A Patrone for a camera according to claim 23, wherein a magnetic field shielding ink is used for printing said layer.

25. A Patrone for a camera, comprising:
a film storage container made of a non-magnetic material;
a film having a magnetic recording section;
a spool that takes up said film between flanges located at both ends thereof;
magnetic field shielding members comprising layers printed on a surface of each of said flanges; and
a leader that is located in a distal part of said film to shield an outer circumference of said film, and being realized by a magnetic field shielding member.

26. A film cassette for enclosing film, comprising:
a cassette shell for shielding film;
a band-like film;
a spool that is placed in said cassette shell to be rotatable to wind said film;
said film consisting of two consecutive regions; an exposure region for photography and a non-exposure region that is not subjected to photography; one end of said film being attached to said spool; and when said film is fully wound up about the spool, said non-exposure region shielding an entire circumference of said film;
said cassette shell being a non-magnetic member; said film including a magnetic recording section: and said non-exposure region of said film having a magnetic field shielding layer:
said non-exposure region of said film being a member different from that of said exposure region; and the layer being a sheet made of a resin.

27. A film cassette according to claim 26 wherein said magnetic field shielding layer is coated on a surface of said film.

* * * * *